(12) United States Patent
Schroeder

(10) Patent No.: US 6,786,359 B1
(45) Date of Patent: Sep. 7, 2004

(54) DISPENSER

(76) Inventor: Roy D. Schroeder, 11344 Road Z, Columbus Grove, OH (US) 45830

(*) Notice: Subject to any disclaimer, the term of this patent is extended or adjusted under 35 U.S.C. 154(b) by 0 days.

(21) Appl. No.: 09/965,974

(22) Filed: Sep. 28, 2001

(51) Int. Cl.[7] .................................................. B65H 3/32
(52) U.S. Cl. ........................ 221/222; 221/277; 221/297
(58) Field of Search ................................ 221/222, 221, 221/258, 277, 297

(56) References Cited

U.S. PATENT DOCUMENTS

| | | | | |
|---|---|---|---|---|
| 1,095,319 A | * | 5/1914 | Erwin | 221/23 |
| 1,503,691 A | * | 8/1924 | Love | 141/174 |
| 1,657,850 A | * | 1/1928 | Barbieri | 221/45 |
| 1,667,483 A | * | 4/1928 | Leof | 221/96 |
| 1,767,634 A | * | 6/1930 | Weiss | 221/154 |
| 2,426,707 A | * | 9/1947 | Polsen et al. | 221/223 |
| 2,556,740 A | * | 6/1951 | Polsen et al. | 221/77 |
| 2,695,125 A | * | 11/1954 | Bowen | 53/299 |
| 2,942,758 A | * | 6/1960 | Hogstrom | 221/222 |
| 3,455,484 A | * | 7/1969 | Edwards | 221/222 |
| 3,581,937 A | * | 6/1971 | Johnson et al. | 221/290 |
| 3,756,452 A | * | 9/1973 | Buhayar et al. | 221/1 |
| 4,184,523 A | | 1/1980 | Carrigan et al. | |
| 4,241,848 A | * | 12/1980 | Young | 221/222 |
| 4,319,441 A | | 3/1982 | Credle | |
| 4,643,334 A | | 2/1987 | Steele | |
| 4,949,526 A | | 8/1990 | Brogna et al. | |
| 4,963,072 A | * | 10/1990 | Miley et al. | 414/797.6 |
| 5,038,969 A | | 8/1991 | Berger | |
| 5,131,562 A | | 7/1992 | Brown | |
| 5,172,828 A | | 12/1992 | Ficken et al. | |
| 5,322,188 A | | 6/1994 | Dodaro | |
| 5,328,052 A | | 7/1994 | Kizilos | |
| 5,383,571 A | | 1/1995 | Gunderson | |
| 5,738,246 A | * | 4/1998 | Chung | 221/222 |
| 5,944,220 A | | 8/1999 | Garske et al. | |
| 5,960,989 A | | 10/1999 | Gunderson | |

FOREIGN PATENT DOCUMENTS

| | | | | |
|---|---|---|---|---|
| CA | 689844 | * | 6/1964 | 221/223 |
| GB | 2212793 | * | 8/1989 | 221/222 |
| SU | 1196220 | * | 12/1985 | 221/221 |

* cited by examiner

Primary Examiner—Donald P. Walsh
Assistant Examiner—Daniel K Schlak
(74) Attorney, Agent, or Firm—Stevens & Showalter LLP

(57) ABSTRACT

A dispenser is provided for dispensing objects including for example, container lids for beverages such as soft drinks, coffee, tea, and juice. For example, a coaxial stack of lids is loaded into a housing of the dispenser. Upon actuation of a the dispenser, the bottom-most lid in the stack of lids is delivered to a discharge area by passing the bottom-most lid through a nip point defined between a pair of oppositely rotating indexing shafts. Once the bottom-most lid is delivered to a discharge area, the indexing shafts are brought to rest.

21 Claims, 5 Drawing Sheets

DISPENSER

BACKGROUND OF THE INVENTION

The present invention relates in general to dispensing devices, and in particular, to a dispenser for sequentially dispensing objects such as lids and cups.

Many fast food restaurants and stores including convenience markets sell beverages to customers that are served in disposable containers such as paper, plastic, and Styrofoam cups. To keep the contents of the containers from spilling or otherwise upsetting, disposable lids are temporarily sealed around the open end of the container.

The disposable lids are often kept in open trays such as horizontal or slightly inclined trays for quick retrieval, typically by a clerk, worker, or directly by the customer. However, the lids sometimes stick together causing slow downs in retrieving a single lid from the tray. Further, often times, several lids are physically touched creating the potential to spread bacteria and other contaminations.

In addition to the potential for contamination, the trays consume considerable amounts of valuable counter space. Additionally, persons wishing to obtain a lid from such a tray must grasp at the lids, often with two hands, thus the work area is likely to become cluttered with loose lids lying in the proximity to the tray.

Accordingly, there is a need for a dispenser arranged to dispense objects such as container lids and cups that is simple in construction and easy in operation such that the dispenser is suitable for use by store employees and customers alike. Further, there is a need for a dispenser that takes up a small amount of counter space.

SUMMARY OF THE INVENTION

A dispenser is provided for dispensing objects that can be formed into a coaxial stack, including for example, cups and container lids for beverages such as soft drinks, coffee, tea, and juice. The objects to be dispensed are arranged into a coaxial stack and loaded into a housing of the dispenser. Upon actuation of the dispenser, at least the bottom-most object in the stack of objects is delivered to a discharge area by passing the bottom-most object through a nip point defined between a pair of oppositely rotating indexing shafts. Once the dispensing operation is complete, the indexing shafts are brought to rest.

Accordingly, it is an object of the present invention to provide a dispenser that passes a bottom-most object in a stack of objects through a nip point defined by a pair of synchronously driven, rotatable indexing shafts.

It is an object of the present invention to provide a dispenser that contains objects in a housing such that the objects are maintained in a sanitary and orderly arrangement.

Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

Figure 1:
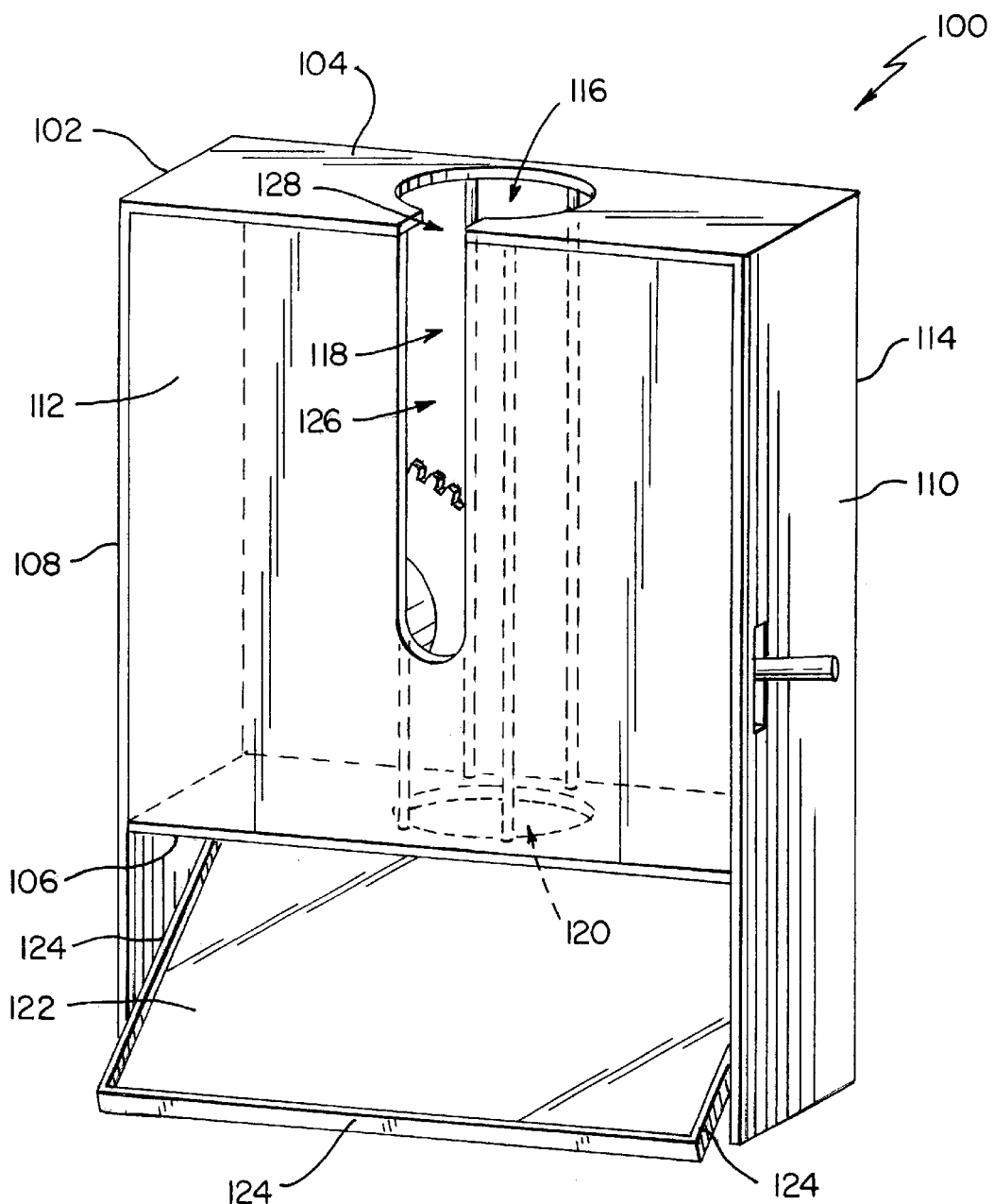
FIG. 1 is an illustration of the dispenser according to one embodiment of the present invention.

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that mechanical and electrical changes may be made without departing from the spirit and scope of the present invention. Further, like structure is referred to with like reference numerals throughout.

As shown in FIG. 1, a dispenser 100 for dispensing lids includes a housing 102 having a top surface 104, a bottom surface 106, a pair of side surfaces 108, 110, a front face 112, and a back face 114. A feeder access aperture 116 is provided through the top surface 104 for providing access to the feeder area 118. The feeder area 118 is the area within the housing 102 where the lids are cued for dispensing as will be more fully explained herein. The closed or at least substantially closed housing 102 thus provides a sanitary, neat, and convenient manner to dispense lids. Further, while not shown, depending upon usage, an optional lid may be provided to cover the feeder access aperture when the lid dispenser 100 is not being loaded. The dimensions of the feeder access aperture 116 can vary depending upon the size of the intended lids, however, the feeder access aperture 116 should be at least slightly larger than the largest lid intended for use in the dispenser 100.

A discharge aperture 120 is provided in the bottom surface 106 to provide an exit means for lids contained within the housing 102 to transition into the discharge area 122. The discharge aperture 120 is substantially coaxially aligned with the feeder access aperture 116, and as with the feeder access aperture 116, the discharge aperture 120 should be at least slightly larger than the largest intended lid for use with the dispenser 100, however the dimensions of the feeder access aperture 116 and the discharge aperture 120 need not exactly coincide.

As illustrated, the discharge area 122 is implemented as a delivery table, and comprises a substantially planar surface that extends underneath the bottom surface 106 of the housing 102 at least a sufficient amount to underlie the discharge aperture 120. The surface of the discharge area 122 is angled forward and has a low surface energy such that a lid 130 that discharges through the discharge aperture 120 and onto the surface of the discharge area 122 will slide forward in a single, continuous, gravity driven action. Thus the lid 130 may be easily retrieved and used to seal a beverage container once discharged. Implementing the discharge area 122 as a delivery table allows the dispenser 100 to be suitable for setting on a counter top, mounting within cabinets or drawers, hung or otherwise suspended on walls, or any other installation desired. The discharge area 122 optionally further includes a lid guard 124 that provides an abutment surface for lids that slide down the discharge area 122 to prevent cluttered or otherwise disorganized workspaces.

The dispenser also further comprises an optional guide slot 126 through the front face 112 of the housing 102. The guide slot 126 is aligned generally to expose at least a portion of the feeder area 118 and allows a user to reach into the feeder area 116 from the outside of the housing 102 to make adjustments to the stack of lids, such as when loading the dispenser 100, or to plumb or otherwise straighten the stack of lids therein. For convenience, the guide slot 126 intersects the feeder access aperture 116 by extending a cut out portion 128 of the top surface 104 radially outward from the feeder access aperture 116 towards the guide slot 126. It will be appreciated that the guide slot 126 need not extend the entire distance from the top surface 104 to the bottom surface 106 as illustrated. Rather, the guide slot may optionally only expose that portion of the feeder area required for loading or unloading the dispenser 100. Further, while not shown, an optional cover may be provided to close off the guide slot while the dispenser 100 is in use.

Figure 2:
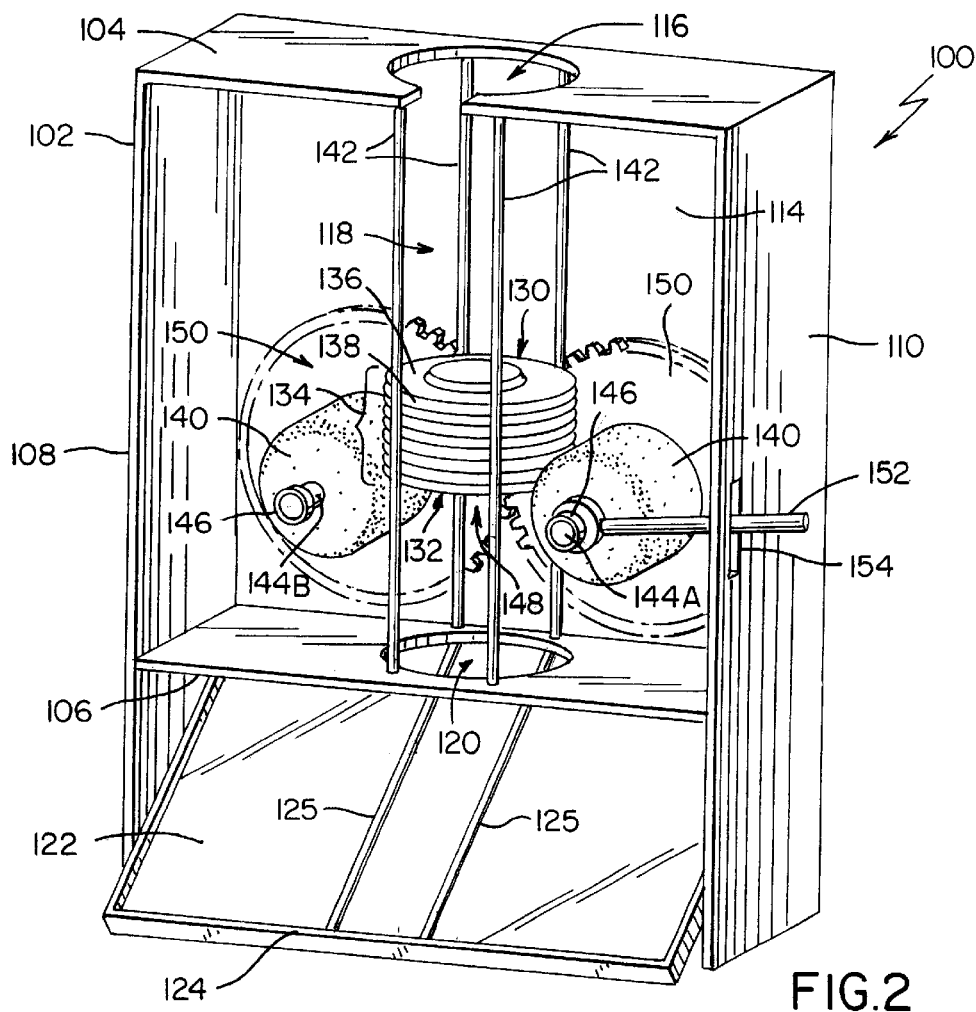
FIG. 2 is an illustration of the dispenser according to one embodiment of the present invention with the front face removed.

Referring to FIG. 2, the dispenser 100 is illustrated with the front face 112 removed to facilitate discussion of the operation of the dispenser 100. The dispenser 100 is particularly suited for serially dispensing lids 130, and more particularly, for dispensing a bottom-most lid 132 from a substantially coaxially aligned stack of lids 134. The bottom-most lid 132 is identical to the remainder of the lids 130 in the stack of lids 134 and is given a unique reference numeral only to facilitate discussion of the invention herein.

The lids 130 are typically flexible, concavo-convex plastic structures having a generally flat and circular top surface 136, and a annular flanged rim 138 extending therefrom, allowing the lids 130 to form in a stack of lids 134. However, the configuration of the lids 130 may vary depending upon the beverage container (not shown) for which the lids 130 are designed. For example, the lids 130 may have raised rims, inclined or otherwise outwardly flared lip or edge portions, flanges or other features common in the art.

The lids 130 to be dispensed are arranged as a vertical, coaxial stack of lids 134, and inserted through the feeder access aperture 116. The stack of lids 134 are lowered into the lid feeder area 118 until the bottom-most lid 132 is brought to rest against a pair of opposing grippers 140.

At least one alignment surface 142 circumscribes the lid feeder area 118 defining a channel in which the stack of lids 134 maintains a substantially plumb position. As illustrated, the alignment surfaces 142 are implemented as guide rods that longitudinally project from the top surface 104 to the bottom surface 106. The guide rods, or alignment surfaces 142 are disposed in an arcuate fashion radially juxtaposed from the perimeter of the stack of lids 134 such that the stack of lids 134 are freely, yet closely supported so as to not bind or interfere with the travel of the lids 130 towards the grippers 140. However, the alignment surfaces 142 remain in sufficient proximity to the lids 130 that the stack of lids 134 is maintained in a plumb position when loaded within the lid feeder area 118. The alignment surfaces 142 also serve to assist in loading the lids to reduce the opportunity for lids to be loaded crooked or at an angle that would reduce the effectiveness of operation of the dispenser 100.

As the stack of lids 134 is passed down into the lid feeder area 118, at least the bottom-most lid 132 will come to rest in cooperation with the grippers 140. As illustrated, two grippers 140 flank the bottom-most lid 132 on opposite sides thereof. The grippers 140 are provided so as to define a frictional relationship between at least the bottom-most lid 132 and the grippers 140 sufficient for the bottom-most lid 132 to support the weight of the remainder of the stack of lids 134. For example, the grippers 140 are arranged to align on opposite sides of the bottom-most lid 132, and to apply a slight frictional pressure tangentially against the flanged portion, or rim of at least the bottom-most lid 132.

The grippers 140 are supported by a pair of indexing shafts 144A, 144B positioned on opposite sides of the feeder area 118 in such a manner that the pair of indexing shafts 144A, 144B are axially parallel to one another and further arranged within the same horizontal plane. Each of the pair of indexing shafts 144A, 144B extend from the front face 112 (Not shown if FIG. 2) to the back face 114 and are secured in their respective ends by bushings 146 in such a manner that the pair of indexing shafts 144A, 144B are free to rotate. The grippers 140 are each supported by a respective one of the pair of indexing shafts in such a manner as to define a discharge point 148 as the nip point between the grippers 140.

The indexing shafts 144A, 144B are coupled together by a shaft driving device 150 in a manner such that rotation of the pair of indexing shafts 144A, 144B transitions the bottom-most lid 132 through the nip point or discharge point 148. It will be appreciated that the indexing shafts 144A, 144B need not maintain a perfectly parallel axial orientation, nor do the pair of indexing shafts 144A, 144B need to align precisely within the same horizontal plane so long as the indexing shafts rotate in such a manner to pass the bottom-most lid 132 through the nip point defined therebetween.

A first one of the pair of indexing shafts 144A is coupled to a dispensing device 152. As illustrated, the dispensing device 152 comprises a dispensing lever that couples to the indexing shaft 144A, and extends radially from the indexing shaft 144A through to the outside of the housing 102 by passing through a lid advance slot 154 positioned through the side 110 of the housing. The dispensing device 152 secures to the indexing shaft 144A such that rotation of the dispensing device 152 causes complimentary rotation of the indexing shaft 144A. While illustrated as a dispensing lever, it will be appreciated that the dispensing device 152 may be implemented as any mechanical, electrical, or logical element arranged to enable the dispenser to dispense a lid by rotating the pair of indexing shafts 144A, 144B sufficient to pass the bottom-most lid 132 to the discharge area 122. For example, the dispensing device 152 may comprise a ratcheting lever or spring biased lever arranged such that engaging the lever causes axial rotation of the first shaft.

To dispense a lid, the dispensing device 152 is energized. For example, if the dispensing device 152 comprises a lever, transitioning the lever is considered energizing the lever. As the dispensing device 152 is energized, the opposing pair of indexing shafts 144A, 144B rotate a sufficient amount to squeeze the bottom-most lid 132 past the nip point 148. The bottom-most lid 132 is then gravity fed out to the discharge area 122.

As shown in FIG. 2, the discharge area 122 includes optional vertical slats 125. The vertical slats 125 are provided to reduce or eliminate user contact with the discharge area 122. The slats 125 are spaced and sized such that a discharged lid remains elevated off the surface of the discharge area 122 in such a manner that a user grasping the edges of the lid will avoid, or at least encounter minimal contact with the discharge area 122. It will also be recognized that the optional slats 125 may implemented by providing corresponding grooves in the surface of the discharge area 122.

Figure 3:
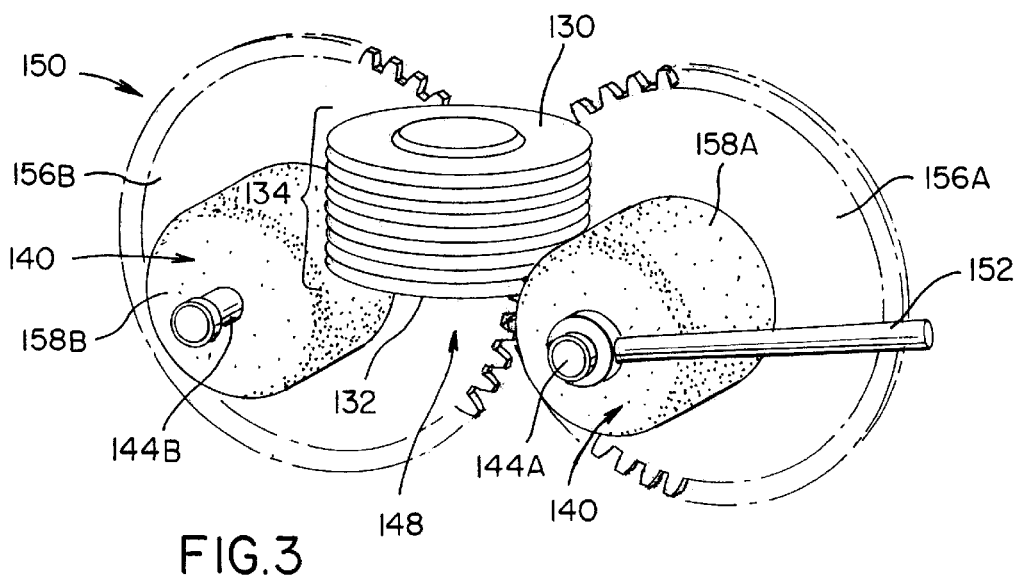
FIG. 3 is an exploded view of a shaft drive device and gripper according to one embodiment of the present invention.

Referring to FIG. 3, according to one embodiment of the present invention, the shaft driving device 150 is implemented as a pair of gears 156A, 156B. Gear 156A is coupled to indexing shaft 144A and gear 156B is coupled to indexing shaft 144B. The gears 156A, 156B are dimensioned such that their teeth intermate. As such, rotation of the dispensing device 152 causes the associated indexing shaft 144A and gear 156A to rotate a corresponding degree. Because the gears 156A, 156B are intermated, the opposing indexing shaft 144B and gear 156B rotate simultaneously and in the opposite direction by the same degree. As such, actuation of the dispensing device 152 results in both of the indexing shafts 144A, 144B rotating axially the same degree, but in opposite directions. While only illustrated with one gear coupled to each of the indexing shafts 144A, 144B, it will be appreciated that any number of additional gears may be used. Further, when using gears 156A, 156B, the dispensing device 152 may couple to one of the indexing shafts 144A, or directly to one of the gears 156A. Further, the dispensing device 152 may couple to a third gear (not shown) that mates with a first one of the gears 156A.

As illustrated, the grippers 140 are implemented as a first feed roller 158A coupled to the surface of the first indexing shaft 144A, and a second feed roller 158B coupled to the surface of the second indexing shaft 144B. The feed rollers 158A, 158B comprise a deformable material of sufficient diameter such that the feed rollers 158A, 158B cooperate to frictionally support the stack of lids 134. Because the gears 156A, 156B synchronize the indexing shafts 144A, 144B, the feed rollers 158A, 158B rotate at equal and opposite speeds at the discharge point 148.

The feed rollers 158A, 158B must be sufficiently compliant to provide a positive gripping action on at least the bottom-most lid 132 within the stack of lids 134, without causing excess deflection or damage to the lids 130. Each of the feed rollers 158A, 158B may be formed for example as a rubber, plastic, cloth, or other suitable material formed into a disc and mounted to their respective indexing shafts 144A, 144B. For example, the feed rollers 158A, 158B may be bonded, floated over and frictionally held thereto, keyed, or otherwise secured such that the feed rollers 158A, 158B rotate as an integral unit with their respective indexing shaft 144A, 144B.

Figure 4:
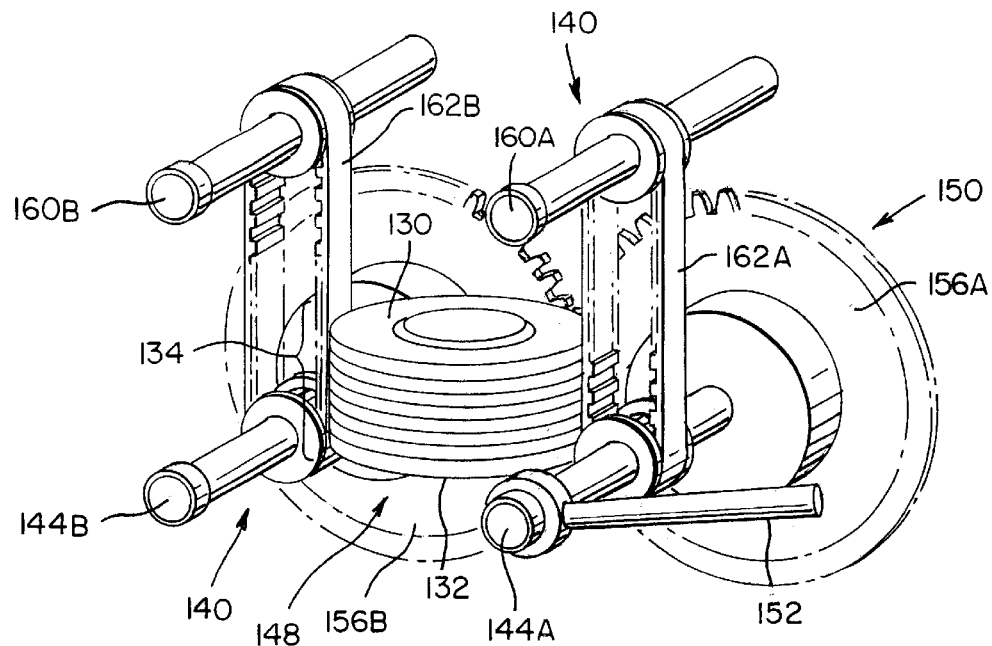
FIG. 4 is an exploded view of a shaft drive device and gripper according to another embodiment of the present invention.

Referring to FIG. 4, the grippers 140 may also be implemented by including a second pair of indexing shafts 160A, 160B. The second pair of indexing shafts 160A, 160B are positioned directly above their respective first pair of indexing shafts 144A, 144B. Indexing shaft 144A is coupled to indexing shaft 160A by belt 162A. Likewise, indexing shaft 144B is coupled to indexing shaft 160B by belt 162B. Under this arrangement, numerous ones of the lids 130 may be gripped and sequentially advanced towards the discharge point 148 each time the dispensing device is activated.

Figure 5:
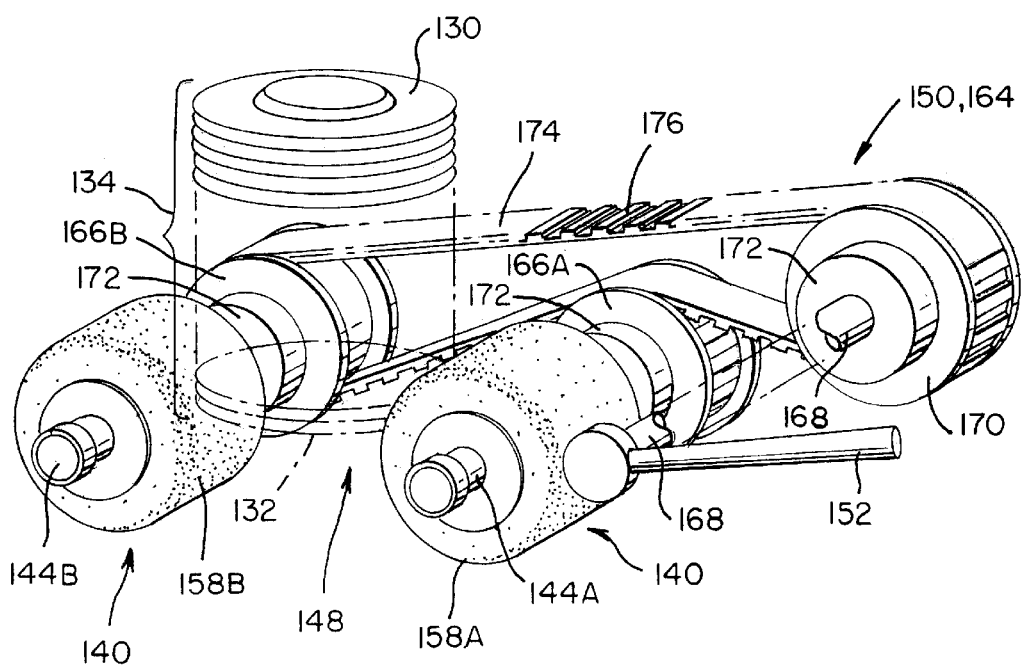
FIG. 5 is an exploded view of a shaft drive device and gripper according to another embodiment of the present invention.
Figure 6:
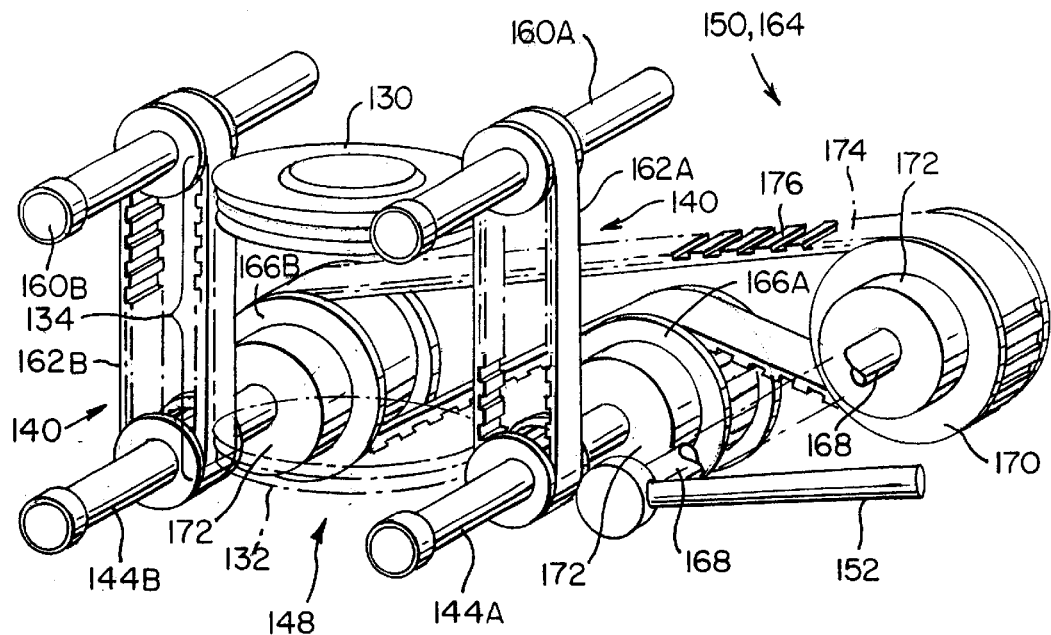
FIG. 6 is an exploded view of a shaft drive device and gripper according to another embodiment of the present invention.

Referring to FIGS. 5 and 6, the shaft driving device 150 may also be implemented using a driving belt system 164. The driving belt system 164 comprises a rim 166A positioned on the indexing shaft 144A behind the feed roller 158A. Likewise, a rim 166B is positioned on the indexing shaft 144B behind the feed roller 158B. A drive shaft 168 is positioned proximate the first indexing shaft 144A. A rim 170 is positioned on the drive shaft 168 in alignment with the rims 166A, 166B. Optional rim locks 172 may be used to secure the rims in place and prevent the rims 166A, 166B, 170 from sliding.

The drive belt then slips around the rim 170, stretches around the rim 166B, and passes over the top portion of the rim 166A. Under this configuration, rotation of the drive shaft 168, such as by activation of the dispensing device 152 causes the belt 174 to rotate, driving the pair of indexing shafts 144A, 144B in equal and opposite directions. The positioning of the drive shaft 168 proximate to the first indexing shaft 144A, and the respective dimensions of the rims 166A, 166B and 170 are selected so that drive belt 174 maintains a positive gripping force and that there is no slippage. For example, the drive belt 174 may contain ribs or otherwise contain profilated sections 176 to provide an additional frictional surface sufficient to cause the indexing shafts 144A, 144B to rotate without slippage. Further, the rim 170 on the drive shaft 168 may be larger in diameter than the rims 166A, 166B on the pair of indexing shafts 144A, 144B to ensure that the top portion of the drive belt clears the first rim 166A, and that the bottom portion of the drive belt 174 wraps around a sufficient portion of the top part of the rim 166A to maintain an adequate frictional relationship.

As illustrated in FIG. 5, the belt driving system 164 may be used in conjunction with the feed rollers 158A, 158B, or alternatively, as illustrated in FIG. 6, with the second pair of indexing shafts 160A, 160B and belts 162A, 162B. Operation is otherwise as described above. It shall be appreciated that the shaft driving device 150 may comprise other combinations of gears, rollers, belts, cams, and similar devices so long as the indexing shafts 144A, 144B may be brought to rotate in equal and opposite directions. Likewise, the grippers 140 or may comprise structures other than the feed rollers and belts, including the surface of the indexing shafts 144A, 144B themselves so long as pair of indexing shafts 144A, 144B cause the stack of lids 134 to sequentially advance towards the discharge point 148 each time the dispensing device 152 is actuated.

Figure 7:
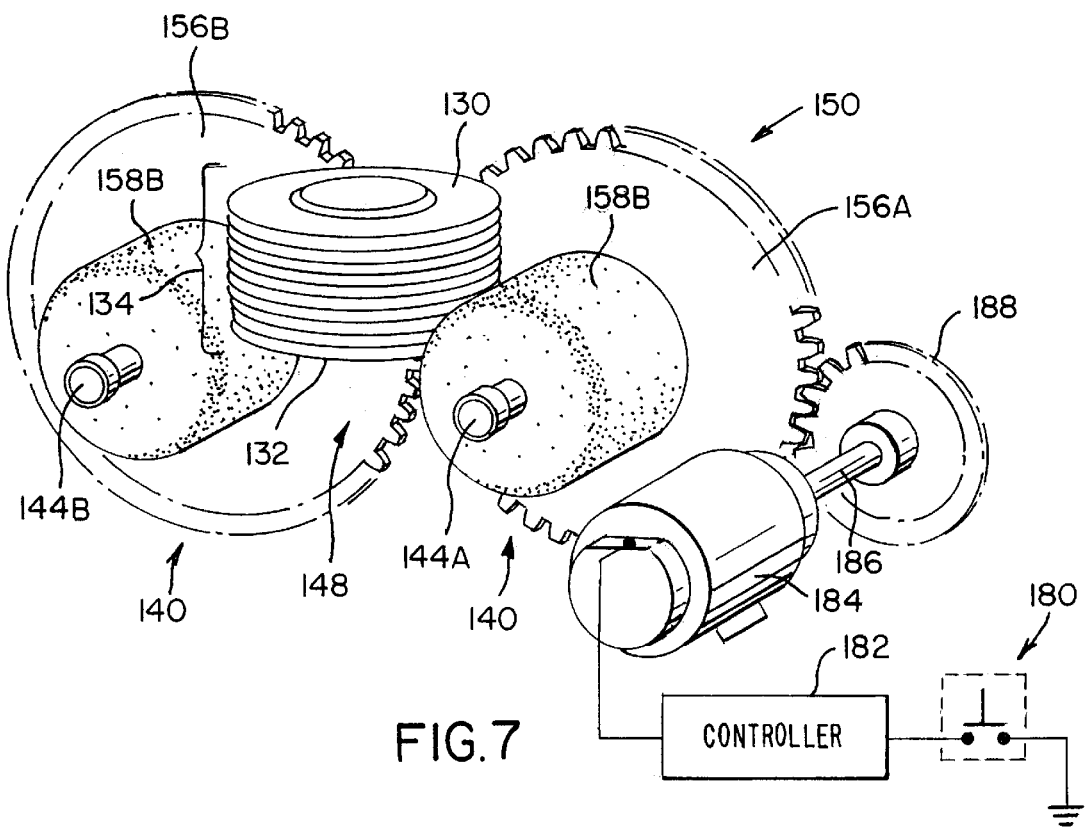
FIG. 7 is a schematic illustration of a motor controlled dispensing device according to another embodiment of the present invention, and, FIG. 8 is an exploded view of a shaft drive device and cup gripper according to another embodiment of the present invention.

As illustrated in FIG. 7, the pair of indexing shafts 144A, 144B may also be electronically rotated. As schematically illustrated, a switch 180 is coupled to a controller 182. The controller 182 is coupled to a drive motor 184 having a motor shaft 186 coupled to a gear 188 that intermates with gear 156A. The controller is configured to rotate the motor 184 a sufficient number of turns to advance the bottom-most lid 132 through the discharge point 148. It will be appreciated that other electrical systems are possible within the spirit of the present invention. For example, solenoids, relays and other devices can be used in conjunction with, or in lieu of, the motor 184 or other electrical components described above. Further, any number of gears may be used to cause rotation of the pair of indexing shafts 144A, 144B. Finally, as illustrated, the shaft driving device 150 is implemented as a pair of gears 156A, 156B. However, as described more fully herein, other embodiments are possible. As such, the exact configuration of the motor will depend upon the implementation of the shaft driving device 150.

While the present invention has been described herein with reference to container lids for beverages, it will be appreciated that other objects may be dispensed in a similar fashion. For example, the present invention may be modified to enable dispensing of condiment cups or virtually any objects that can be formed into a stack whereby the bottom-most one of the stack of objects can be gripped frictionally from at least two opposite sides, and pass through the nip point of a pair of sequentially driven shafts.

Figure 8:
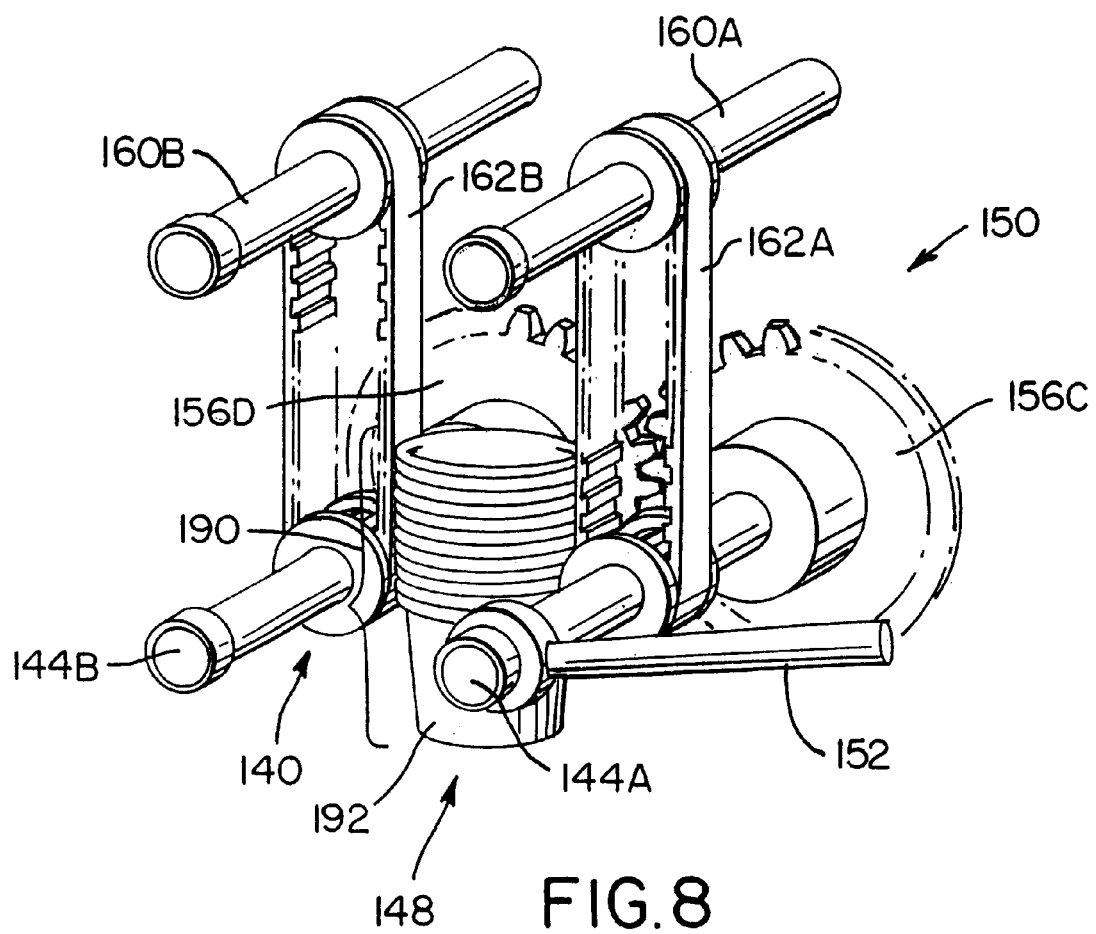

Referring to FIG. 8, one embodiment of the present invention illustrates a dispensing arrangement for dispensing a coaxial stack of paper condiment cups 190. The bottom-most cup 192 is passed through the discharge point 148 each time the dispensing device 152 is actuated in a manner identical to that described more fully herein.

It will be appreciated that the gears 156C, 156D are dimensioned to provide the proper spacing for the object intended to be dispensed. For example, the gears 156C, 156D will likely be smaller for dispensing paper cups 190 than the gears 156A, 156B discussed above with reference to dispensing lids (not shown in FIG. 8), however the operation is otherwise identical to that described more fully herein. That is, actuation of the dispensing device 152 results in the gears 156C, 156D, and thus the indexing shafts 144A, 144B, rotating axially the same degree, but in opposite directions.

Further, it will be appreciated that the cups 190 may be suitably dispensed with a number of suitable modifications, including those discussed more fully herein.

Having described the invention in detail and by reference to preferred embodiments thereof, it will be apparent that modifications and variations are possible without departing from the scope of the invention defined in the appended claims.

What is claimed is:

1. A lid dispenser for sequentially dispensing flexible lids for beverage containers, the lid dispenser comprising:
    a housing having a feeder access aperture therein;
    a feeder area within said housing generally in register with said feeder access aperture;
    a lid discharge area positioned underneath said lid feeder area;
    at least one alignment surface within said housing arranged to direct and guide a substantially vertical stack of flexible lids for beverage containers positioned within said feeder area toward said lid discharge area;
    a pair of grippers positioned within said housing between said feeder area and said lid discharge area arranged to flank at lest a bottom-most lid in said stack of lids,
    a first pair of indexing shafts defining a first indexing shaft and a second indexing shaft, arranged within said housing, each one of said first pair of indexing shafts arranged to support an associated one of said pair of grippers;
    a shaft driving device arranged to couple said first pair of indexing shafts such that when said dispensing device is activated, each indexing shaft rotates in an opposite direction; and
    a dispensing device that extends from outside of said housing to within said housing and couple directly to at least one of said first indexing shaft, said second indexing shaft, and said shaft driving device, said dispensing device arranged such that manual operation thereof causes said first pair of indexing shafts to rotate so as to pass the bottom most one of the stack of lids positioned within said feeder area into said lid discharge area.

2. A lid dispenser according to claim 1, wherein, upon actuation of said dispensing device, each indexing shaft rotates a predetermined amount sufficient to pass the bottom-most lid in the stack of lids through the nip point and into said lid discharge area.

3. A lid dispenser according to claim 2, wherein said shaft driving device comprises at least two intermated gears, each gear axially coupled to an associated one of said pair of indexing shafts.

4. A lid dispenser according to claim 1, wherein said lid grippers comprise at least one generally cylindrical and compliant feed roller sleeved over each one of said first pair of indexing shafts and defining a nip point between said first pair of indexing shafts.

5. A lid dispenser according to claim 1, further comprising:
    a second pair of indexing shafts positioned above said first pair of indexing shafts and generally in register therewith; and,
    wherein each lid gripper comprise a belt arranged to couple a select one of said first pair of indexing shafts to an associated one of said pair of second indexing shafts generally thereabove, said belts arranged to frictionally grip at least one of the lids in the stack of lids.

6. A lid dispenser according to claim 1, further comprising a lid guide slot through a face of said housing in register with said feeder area, said slot dimensioned suitably to allow a user of said lid dispenser to access and make adjustments to said stack lids.

7. A lid dispenser according to claim 1, wherein said lid discharge area is external to said housing and positioned generally under said feeder area such that when said dispensing device is activated, said first pair of indexing shafts gravitationally deliver the bottom-most lid in the stack of lids to said lid discharge area.

8. A lid dispenser according to claim 1, wherein said alignment surface comprises a guide rod secured to said housing arranged about the perimeter of said feeder area.

9. A lid dispenser according to claim 1, wherein said housing further comprises a lid advance slot therein, wherein said lever extends outside of said housing through said lid advance slot.

10. A lid dispenser according to claim 9, wherein said lever comprises a ratcheting lever arranged such that transitioning said ratcheting lever within said lid advance slot in a first direction causes rotation of said first pair of indexing shafts and rotation of said ratcheting lever in a second direction does not cause rotation of said first pair of indexing shafts.

11. A lid dispenser for sequentially dispensing flexible lids for beverage containers, the lid dispenser comprising:
    a housing having a feeder access aperture therein;
    a feeder area within said housing generally in register with said feeder access aperture;
    a lid discharge area positioned underneath said lid feeder area;
    at least one guide secured to said housing about the perimeter of said feeder area arranged to direct and guide a substantially vertical stack of flexible lids for beverage containers positioned within said feeder area toward said lid discharge area;
    a first pair of indexing shafts defining a first indexing shaft and a second indexing shaft, arranged within said housing, a first one of said first pair of indexing shafts on a first side of said feeder area, and a second one of said first pair of indexing shafts on a second side of said feeder area opposite said first side of said feeder area;

a lid gripper coupled to each one of said first pair of indexing shafts, wherein said lid grippers are operationally configured to apply a frictional pressure against a rim portion of at least said bottom-most lid;

a drive shaft arranged within said housing generally parallel to said first pair of indexing shafts;

a rim around the perimeter of said drive shaft and each of said first pair of indexing shafts;

a looped continuous drive belt arranged so as to engage each rim and extend around said drive shaft and a select one of said first pair of indexing shafts and adjacent to the other one of said first pair of indexing shafts such that rotation of said drive shaft causes each indexing shaft to rotate in an opposite direction;

a dispensing device that extends from outside said housing to within said housing so as to couple directly to at least one of said first indexing shaft, said second indexing shaft, and said shaft driving device, said dispensing device operable to selectively cause said first pair of indexing shafts to rotate so as to pass the bottom most one of the stack of lids positioned within said feeder area into said lid discharge area.

12. A lid dispenser according to claim 11, wherein said lid grippers comprise at least one generally cylindrical and compliant feed roller sleeved over each one of said first pair of indexing shafts and defining a nip point between said first pair of indexing shafts.

13. A lid dispenser according to claim 11, further comprising:

a second pair of indexing shafts positioned above said first pair of indexing shafts and generally in register therewith; and, wherein each lid gripper comprise a belt arranged to couple a select one of said first pair of indexing shafts to an associated one of said pair of second indexing shafts generally thereabove, said belts arranged to frictionally grip at least one of the lids in the stack of lids.

14. A lid dispenser according to claim 11, further comprising a lid guide slot through a face of said lid dispenser in register with said feeder area, said slot dimensioned suitably to allow a user of said lid dispenser to access and make adjustments to said stack of lids.

15. A lid dispenser for sequentially dispensing flexible lids for beverage containers, the lid dispenser comprising:

a housing having a feeder access aperture therein;

a feeder area within said housing generally in register with said feeder access aperture;

a lid discharge area positioned underneath said lid feeder area;

at least one guide rod secured to said housing about the perimeter of said feeder area arranged to direct and guide a substantially vertical stack of flexible lids for beverage containers positioned within said feeder area toward said lid discharge area;

a first pair of indexing shafts arranged within said housing, a first one of said first pair of indexing shafts on a first side of said feeder area, and a second one of said first pair of indexing shafts on a second side of said feeder area opposite said first side of said feeder area;

at least one feed generally cylindrical and compliant roller sleeved over each one of said first pair of indexing shafts and defining a nip point between said first pair of indexing shafts, said feed rollers arranged to provide frictional support to the stack of lids positioned within said lid feeder area;

a shaft driving device arranged to couple said first pair of indexing shafts such that when said first one of said first pair of indexing shafts is brought to rotate, said second one of said first pair of indexing shafts is caused to rotate in a generally complimentary and opposite direction; and, a dispensing device coupled to a select one of said first pair of indexing shafts and said shaft driving device, said dispensing device manually operable to cause said first pair of indexing shafts to rotate a predetermined amount so as to pass the bottom most one of the stack of lids positioned within said feeder area through the nip point and into said lid discharge area.

16. A lid dispenser according to claim 15, wherein said shaft driving device comprises at least two intermated gears.

17. A lid dispenser according to claim 15, wherein said shaft driving device comprises:

a drive shaft arranged within said housing and coupled to said dispensing device;

a rim around the perimeter of said drive shaft and each of said first pair of indexing shafts; and, a drive belt engaging each rim such that rotation of said drive shaft causes each indexing shaft to rotate in a generally complimentary and opposite direction, wherein said dispensing device is arranged to selectively cause said first pair of indexing shafts to rotate by rotating said drive shaft.

18. A lid dispenser for sequentially dispensing flexible lids for beverage containers, the lid dispenser comprising:

a housing having a feeder access aperture therein;

a feeder area within said housing generally in register with said feeder access aperture;

a lid discharge area positioned underneath said lid feeder area;

at least one guide rod secured to said housing about the perimeter of said feeder area arranged to direct and guide a substantially vertical stack of flexible lids for beverage containers positioned within said feeder area toward said lid discharge area;

a first pair of indexing shafts journaled for rotation within said housing, a first one of said first pair of indexing shafts on a first side of said feeder area, and a second one of said first pair of indexing shafts on a second side of said feeder area opposite said first side of said feeder area;

a second pair of indexing shafts journaled for rotation within said housing such that a first one of said second pair of indexing shafts is positioned substantially vertically above and generally in register with said first one of said first pair of indexing shafts, and a second one of said second pair of indexing shafts is positioned substantially vertically above and generally in register with said second one of said first pair of indexing shafts;

a pair of belts, a first one of said pair of belts arranged to couple said first one of said first pair of indexing shafts to said first one of said second pair of indexing shafts, and a second one of said pair of belts arranged to couple said second one of said first pair of indexing shafts to said second one of said second pair of indexing shafts, said pair of belts thus arranged to define two parallel and substantially vertical surfaces that frictionally grip at least one of the lids in the stack of lids;

a shaft driving device arranged to couple said first pair of indexing shafts such that when said first one of said first pair of indexing shafts is brought to rotate, said second one of said first pair of indexing shafts is caused to rotate in a generally complimentary and opposite direction; and, a dispensing device coupled to at least one of said first pair of indexing shafts and said shaft driving device, said dispensing device manually operable to selectively cause said first pair of indexing shafts to rotate so as to pass the bottom most one of the stack of lids positioned within said feeder area into said lid discharge area.

19. A lid dispenser according to claim 18, wherein said shaft driving device comprises at least two intermated gears.

20. A lid dispenser according to claim 18, wherein said shaft driving device comprises:

a drive shaft arranged within said housing and coupled to said dispensing device;

a rim around the perimeter of said drive shaft and each of said first pair of indexing shafts; and, a drive belt engaging each rim such that rotation of said drive shaft causes each indexing shaft to rotate in a generally complimentary and opposite direction, wherein said dispensing device is arranged to selectively cause said first pair of indexing shafts to rotate by rotating said drive shaft.

21. A method of dispensing flexible lids for beverage containers comprising:

providing a housing having a feeder access aperture therein;

installing a substantially vertical stack of flexible lids for beverage containers into said lid dispenser by positioning said stack of lids into said exposed feeder access aperture;

supporting said vertical stack of lids by frictionally gripping at least a bottom- most lid of a stack of lids in a nip point defined between a pair of grippers, each of said pair of grippers supported by an indexing shaft;

providing a shaft driving device coupled to each indexing shaft that is configured to selectively rotate each of said pair of grippers in opposite directions; and manually activating a lever extending from outside of said housing, wherein said lever extends inside of said housing so as to couple directly to at least one of said first pair of indexing shafts and said shaft driving device to selectively rotate a lid through said nip point.

* * * * *

UNITED STATES PATENT AND TRADEMARK OFFICE
CERTIFICATE OF CORRECTION

PATENT NO. : 6,786,359 B1
DATED : September 7, 2004
INVENTOR(S) : Roy D. Schroeder It is certified that error appears in the above-identified patent and that said Letters Patent is hereby corrected as shown below:

Column 7,
Line 46, "at lest a" should read -- at least a --;
Line 57, "and couple directly" should read -- and couples directly --;

Column 8,
Line 29, "said stack lids" should read -- said stack of lids --;

Signed and Sealed this

Fourteenth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,786,359 B1
DATED : September 7, 2004
INVENTOR(S) : Roy D. Schroeder It is certified that error appears in the above-identified patent and that said Letters Patent is hereby corrected as shown below:

Title page,
Item [*] Notice, should read -- Under 35 U.S.C. 154(b), the term of this patent shall be extended for 253 days. --.

Signed and Sealed this

Twenty-ninth Day of November, 2005

JON W. DUDAS
*Director of the United States Patent and Trademark Office*